(12) United States Patent
Jacobs et al.

(10) Patent No.: US 10,743,472 B2
(45) Date of Patent: Aug. 18, 2020

(54) AGRICULTURAL APPARATUS FOR FORMING FROM A PREVIOUSLY-CUT AGRICULTURAL CROP A WINDROW ON A FIELD AND METHOD THEREOF

(71) Applicant: Kverneland Group Mechatronics B.V., Nieuw-Vennep (NL)

(72) Inventors: Jeroen Jacobs, Alphen aan den Rijn (NL); Edgar de Bruijn, Mijdrecht (NL)

(73) Assignee: Kverneland Group Mechatronics B.V., Nieuw-Vennep (NL)

( * ) Notice: Subject to any disclaimer, the term of this patent is extended or adjusted under 35 U.S.C. 154(b) by 248 days.

(21) Appl. No.: 15/936,904

(22) Filed: Mar. 27, 2018

(65) Prior Publication Data

US 2018/0271021 A1    Sep. 27, 2018

(30) Foreign Application Priority Data

Mar. 21, 2017    (EP) .................................. 17162020

(51) Int. Cl.
*A01D 78/10* (2006.01)
*A01D 78/00* (2006.01)
(Continued)

(52) U.S. Cl.
CPC ....... *A01D 78/1085* (2013.01); *A01D 34/667* (2013.01); *A01D 78/001* (2013.01);
(Continued)

(58) Field of Classification Search
CPC .............. A01D 78/1085; A01D 34/667; A01D 89/003; A01D 78/001; A01D 2101/00;
(Continued)

(56) References Cited

U.S. PATENT DOCUMENTS 3,716,973 A  *   2/1973  Kidd ...................... A01D 34/66
                                                          56/6
3,911,649 A  *  10/1975  Scarnato ................ A01D 57/28
                                                          56/1
(Continued)

FOREIGN PATENT DOCUMENTS

DE    2753102 A1  *  7/1978  ......... A01D 78/1078
EP    0200855 A1    11/1986
(Continued)

OTHER PUBLICATIONS

Extended European Search Report, completed Jul. 25, 2017, pertaining to EP17162020.6, filed Mar. 21, 2017.

*Primary Examiner* — Arpad Fabian-Kovacs
(74) *Attorney, Agent, or Firm* — Dinsmore & Shohl, LLP

(57) ABSTRACT

An agricultural apparatus for forming from previously-cut agricultural crop, such as grass or the like, a windrow on a field, which may comprise: a frame, crop engaging elements supported on the frame and configured to form from previously-cut agricultural crop a windrow on a field, and a control unit configured to control operation of the crop engaging elements. The control unit is further configured to provide control signals to the crop engaging elements in such a way that, in a windrow forming mode of operation, the crop engaging elements are driven to engage with the previously-cut agricultural crop, and form from the previously-cut agricultural crop the windrow which may have a snake line form on the field. Further detailed is a method for forming from previously-cut agricultural crop, such as grass or the like, a windrow on a field.

20 Claims, 3 Drawing Sheets

(51) Int. Cl.
*A01D 89/00* (2006.01)
*A01D 34/66* (2006.01)
*A01D 61/00* (2006.01)
*A01D 101/00* (2006.01)

(52) U.S. Cl.
CPC ............ *A01D 89/003* (2013.01); *A01D 34/66* (2013.01); *A01D 61/004* (2013.01); *A01D 2101/00* (2013.01)

(58) Field of Classification Search
CPC ...... A01D 34/66; A01D 61/004; A01D 57/26; A01D 41/1243; A01D 43/04; A01D 57/28; A01B 69/004
See application file for complete search history.

(56) References Cited

U.S. PATENT DOCUMENTS

| | | | | |
|---|---|---|---|---|
| 5,163,277 A | * | 11/1992 | Fransgaard | A01D 78/12 56/15.5 |
| 5,930,988 A | * | 8/1999 | Hanson | A01D 57/00 56/16.4 A |
| 6,463,726 B1 | * | 10/2002 | Helfer | A01D 78/1085 56/365 |
| 2002/0170723 A1 | * | 11/2002 | Krone | A01B 63/106 172/452 |
| 2013/0014480 A1 | * | 1/2013 | Arnold | A01B 69/004 56/10.2 A |
| 2014/0083071 A1 | * | 3/2014 | Fay, II | A01D 34/667 56/15.6 |
| 2014/0090347 A1 | | 4/2014 | Peden | |
| 2017/0359959 A1 | * | 12/2017 | Wagner | A01D 78/1085 |
| 2018/0325024 A1 | * | 11/2018 | Rotole | A01D 43/10 |
| 2018/0325028 A1 | * | 11/2018 | Rotole | A01D 43/102 |
| 2018/0325029 A1 | * | 11/2018 | Rotole | A01D 57/26 |
| 2019/0116717 A1 | * | 4/2019 | Pauli | A01B 63/008 |

FOREIGN PATENT DOCUMENTS

| | | | | |
|---|---|---|---|---|
| EP | 0332552 A1 | 9/1989 | | |
| EP | 3008985 A1 | 4/2016 | | |
| FR | 2199926 A2 | 4/1974 | | |
| WO | 7900863 A1 | 11/1979 | | |
| WO | 9809500 A1 | 3/1998 | | |
| WO | 2007040721 A2 | 4/2007 | | |
| WO | WO-2010003421 A1 | * | 1/2010 | ............ A01D 91/04 |
| WO | 2014052712 A2 | 4/2014 | | |
| WO | 2015010808 A1 | 1/2015 | | |

\* cited by examiner

AGRICULTURAL APPARATUS FOR FORMING FROM A PREVIOUSLY-CUT AGRICULTURAL CROP A WINDROW ON A FIELD AND METHOD THEREOF

TECHNICAL FIELD

The present disclosure refers to an agricultural apparatus and a method for forming from a previously-cut agricultural crop, such as grass or the like, a windrow on a field.

BACKGROUND

After cutting, an agricultural crop such as grass or the like may be conditioned by an agricultural apparatus for forming a windrow on a field. The agricultural apparatus may be provided with a rake device. Thereby, the agricultural crop is prepared to be picked up in a later stage by, for example, a baler or a loader wagon.

Document WO 2014/052712 A2 discloses a method for capturing images of a windrow and determining a cross section of the windrow based on the captured images for providing a yield map.

Document WO 79/00863 A1 refers to a crop conditioning apparatus and method. The apparatus for conditioning crops such as grass comprises one or more conditioning devices engaging crop passing through a passage and conditioning the crop by relative movement between the conditioning device and the crop. Each conditioning device may be a brush having a multiplicity of stiff, resilient, elongated elements which are yieldable in more than one plain in response to engagement by the crop by bending of the elements.

Document EP 0 200 855 A1 discloses a crop cutting and conditioning apparatus comprising two vertical axial rotary drum cutters, each having an upper rotor with a crop conveying surface and a lower rotor carrying knives. Gears drive the upper and lower rotors in counter-rotation.

An agricultural implement for raking loose material is disclosed in document WO 98/09500 A1. The rake/haymaker is provided in two sections with an intermediary frame section enabling the displacement of the sections perpendicularly to the travelling direction.

Document WO 2015/010808 A1 refers to a plain mower comprising a plurality of rotary cutters for cutting a crop and a swathing unit for forming the cut crop material into a swath. The swathing unit includes an auger that rotates about an access to transport crop material axially through the swathing unit. The swathing unit can be configured in a first configuration in which the crop material is ejected axially from the auger, and can be re-configured in a second configuration in which the crop material is ejected radially from the auger.

Document WO 2007/040721 A2 discloses a carted hay rake for raking cut crops into a windrow or swath.

SUMMARY

Disclosed herein is an agricultural apparatus and a method for forming from a previously-cut agricultural crop, such as grass or the like, a windrow on a field which allows improved windrow preparation or shaping in the process of windrow forming on the field.

According to an aspect, an agricultural apparatus for forming from a previously-cut agricultural, crop such as grass or the like, a windrow on a field is disclosed. The agricultural apparatus may comprise a frame, crop engaging elements supported on the frame and configured to form from previously-cut agricultural crop a windrow on a field, and a control unit configured to control operation of the crop engaging elements. The control unit is further configured to provide control signals to the crop engaging elements in such a way that, in a windrow forming mode of operation, the crop engaging elements are driven to engage with the previously-cut agricultural crop, and form from the previously-cut agricultural crop the windrow having a snake line form on the field.

According to another aspect, a method for forming from a previously-cut agricultural crop, such as grass or the like, a windrow on a field is disclosed. The method may comprise: providing an agricultural apparatus, moving the agricultural apparatus over a field; controlling operation of crop engaging elements supported on a frame of the agricultural apparatus by a control unit of the agricultural apparatus; operating the crop engaging elements to engage with previously-cut agricultural crop; and providing control signals to the crop engaging elements in such a way that, in a windrow forming mode of operation, the crop engaging elements are driven to engage with the previously-cut agricultural crop and form from the previously cut agricultural crop a windrow having a snake line form on the field.

Forming or conditioning the windrow with a snake line form on the field will help in the process of picking-up the previously-cut crop after swath or windrow forming or shaping by, for example, a baler or a loader wagon. The previously-cut crop provided in the snake line formed windrow can be picked-up for more evenly or balanced loading of the agricultural machine or apparatus picking up the crop material on the field.

The forming of the windrow or swath from the previously-cut crop, within the meaning of the present disclosure, may also be referred to as shaping or conditioning.

The process of preparing the windrow or swath may also be referred to as swathing a snake line shaped windrow or swath.

The agricultural apparatus may further comprise cutting elements supported on the frame and configured to cut the agricultural crop prior to the forming of the windrow. In this embodiment the agricultural apparatus may be provided as a mower. The agricultural crop is cut by the cutting elements. Following, the windrow is formed or shaped with the snake line form by means of controlling the crop engaging elements.

The agricultural apparatus may further comprise a pickup device configured to pick-up the previously-cut agricultural crop from the field. In such embodiment the crop was cut before, for example, by using a different agricultural machine such as a mower. The pick-up device, for example, may be provided on an agricultural apparatus for picking up the previously-cut agricultural crop. Following, the picked up crop material is provided to the crop engaging elements which are controlled to form the snake line formed windrow or swath.

The agricultural apparatus may further comprise a pickup device combined with a crop transfer device like a conveyor belt or auger device configured to pick-up the previously-cut agricultural crop by the pick-up device from the field and to deliver the crop in a sideways direction by the transfer device which is arranged behind the pick-up device seen from the direction of travel. The crop was cut before, for example, by using a mower. The pick-up device and the transfer device, for example, may be provided on an agricultural apparatus for picking up and delivering the previously-cut agricultural crop into a sideways direction. Following, the picked up crop and sideways delivered material is provided to the crop engaging elements which are controlled to form the snake line formed windrow.

The agricultural apparatus may further comprise a crop pass through which the previously-cut agricultural crop guided to the crop engaging elements. For example, the crop pass may be extending between the cutting elements and the crop engaging elements for conveying or guiding the previously-cut agricultural crop from the cutting elements to the crop engaging elements. In an alternative embodiment, the crop pass may extend between the pick-up device and the crop engaging elements for guiding or conveying the previously-cut agricultural crop from the pick-up device to the crop engaging elements which are forming the windrow with the snake line form on the field. A conveyor belt and/or an auger device may be provided between the pick-up device and the crop engaging elements in the crop pass.

The crop engaging elements may comprise rake elements. The one or more rakes may be provided as rotor rakes. In this embodiment, the agricultural apparatus may be provided as a rake or rake apparatus comprising a plurality of rake elements. In operation, the rake elements may be controlled to form the snake line formed windrow from the previously-cut agricultural crop provided on the field over which the agricultural apparatus is moving.

The crop engaging elements may comprise a conveyor. The conveyor may be provided with at least one of a belt element, an auger, and a side delivery device. The conveyor may be provided in the crop pass for conveying the crop.

The crop engaging elements may comprise an output device provided with one or more movable windrow forming, shaping or conditioning elements and configured to output the previously-cut agricultural crop to the field. The one or more windrow forming elements may be pivotably received, for example, on the frame. Movable windrow forming elements located opposite to each other may be pivoted with the same frequency for forming the windrow having the snake line form on the field.

The control unit may be further configured to provide first control signals to the crop engaging elements in such a way that, in a first windrow forming mode of operation, the crop engaging elements are driven to engage with the previously-cut agricultural crop, and form from the previously-cut agricultural crop a windrow having a first snake line form on the field, and to provide second control signals to the crop engaging elements in such a way that, in a second windrow forming mode of operation, the crop engaging elements are driven to engage with the previously-cut agricultural crop, and form from the previously-cut agricultural crop the windrow having a second snake line form on the field, the second snake line form being different from the first snake line form. The crop engaging elements may be operated in the different modes of operation for forming different snake line formed or shaped windrows, the windrows being different with regard to, for example, the windrow width over which the snake line is extending from one side to the other side of the windrow limits on the field. Also, the distance along the windrow between the oscillating up and down may be different for snake line formed windrows generated in different modes of operation.

The frame may be an implement frame of an implement to be trailed by a tractor or mounted on a tractor. In an alternative embodiment, the agricultural machine comprising the frame on which the crop engaging elements are supported may be provided on a self-propelled agricultural machine. The implement, for example, may be provided as a rake, mower or belt rake.

Following, alternative embodiments are described with regard to the method for forming from the previously-cut agricultural crop such as grass or the like the windrow.

The method may further comprise cutting the agricultural crop by cutting elements of the agricultural apparatus.

With regard to the method, it may be provided that the previously-cut agricultural crop is passing through a crop pass provided in the agricultural apparatus to the crop engaging elements. The crop pass may be provided with a funnel-like pass element which is reducing the pass width, thereby, preparing the previously-cut agricultural crop for the windrow forming process.

The method may further comprise forming the previously-cut agricultural crop by at least one of the following crop engaging elements: rake, pick-up, conveyor, and output device provided with one or more movable conditioning elements.

The method may further comprise providing the agricultural apparatus on an implement, and moving the implement over the field by a tractor trailing or carrying the implement.

With regard to the agricultural apparatus, the alternatives described above with regard to the method may apply mutatis mutandis, and vice versa.

In an alternative embodiment, the process of forming the snake line formed windrow may be supported by having a towing apparatus provided between the tractor and the agricultural apparatus as it is known as such from EP 3 008 985 A1. The towing apparatus may comprise at least one first member, which can be coupled to the agricultural apparatus and is associated with a second member. The second member in turn is associated with a third member, which can be coupled to a tractor for towing the agricultural machine. Either or both of the first member and the second member are controlled by at least one respective actuator, for the movement of the agricultural apparatus at least partially independently of the advancement of the tractor. The independent movement may be a snake line movement, thereby, supporting the process of forming the snake line windrow or swath.

BRIEF DESCRIPTION OF DRAWINGS

Following, further details to exemplary aspects are described with reference to figures. In the figures, show.

DETAILED DESCRIPTION

Figure 1:
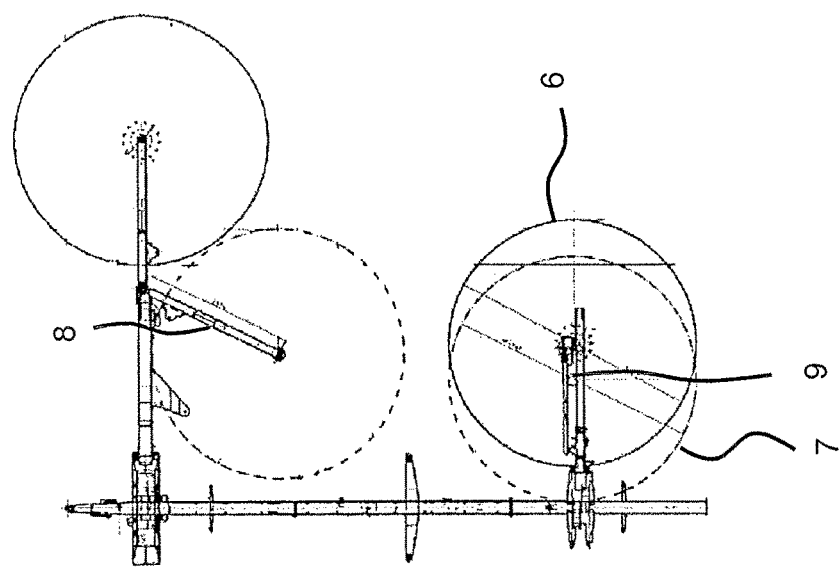
FIG. 1 is a schematic representation of a rake apparatus comprising four rake elements provided as rotor rakes in a top view.
Figure 1:
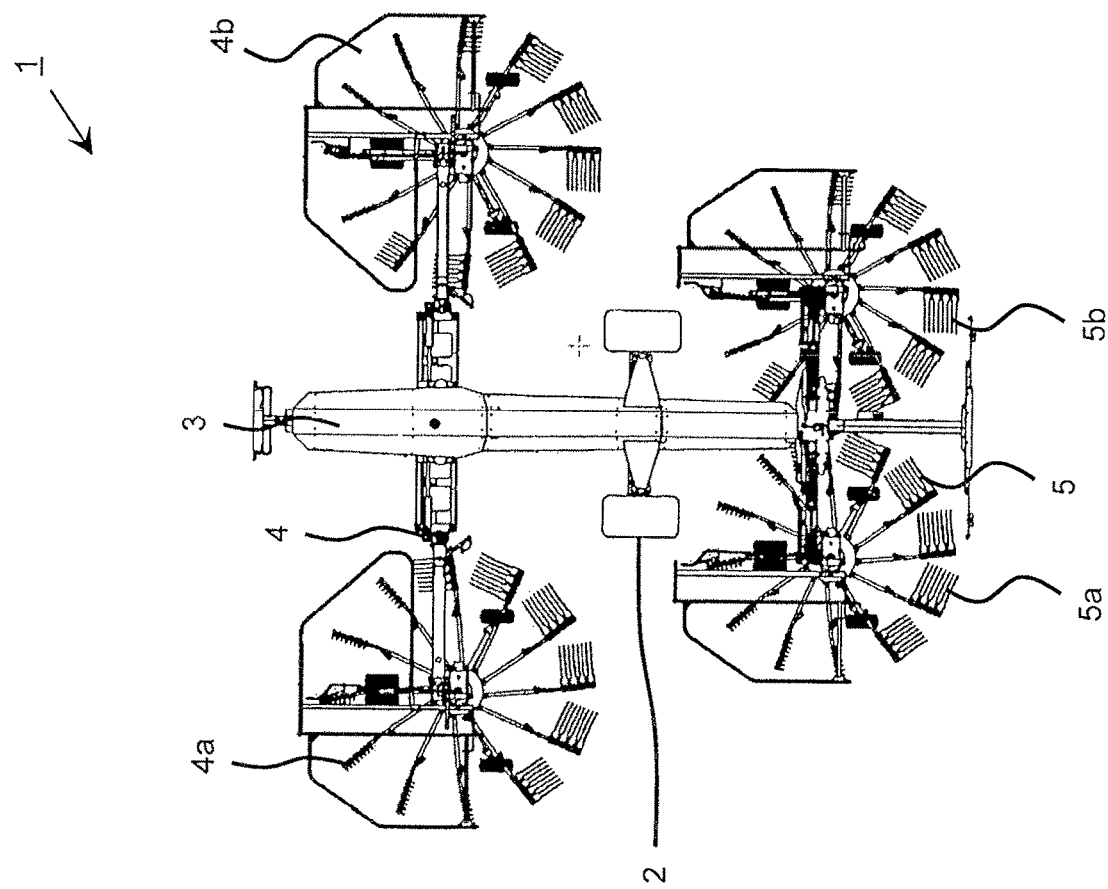

FIG. 1 shows a schematic representation of a rake apparatus (or raker) 1 comprising a wheel frame 2 received on a support frame 3. Front and back rake elements 4, 5 are supported on the support frame 3. Rake elements 4a, 4b and 5a, 5b assigned to each other, in the embodiment shown, are provided as rotor rakes. By means of the rake apparatus 1, a previously-cut agricultural crop spread over a field can be conditioned, formed or shaped into a windrow or swath while the rake apparatus 1, trailed by a tractor (not shown), is moved over the field. The rake apparatus 1 and the tractor in this case are part of an agricultural machine. In an alternative embodiment, a self-driving rake apparatus or rake may be provided.

Referring to FIG. 1, at least the rear rake elements 5a, 5b may be moved with regard to the support frame 3 between a distal and a proximal working position 6, 7 by means of a support arm 9. In the embodiment shown, the support arm 9 may be extended and retracted. As shown in FIG. 1, the option for movement between different working positions is also provided for the front rake elements 4a, 4b, for example, by pivoting a pivot arm 8 around a vertically extending pivot axle.

In addition, the front and back rake elements 4a, 4b, 5a, 5b which provide for a plurality of crop engaging elements each may be relocated from a working position shown in FIG. 1 to a non-working position (not shown) in which the rake elements 4a, 4b, 5a, 5b are lifted up. In the non-working position, no engagement with the previously-cut agricultural crop is possible. Such non-working position may also be referred to a transport position.

Figure 2:
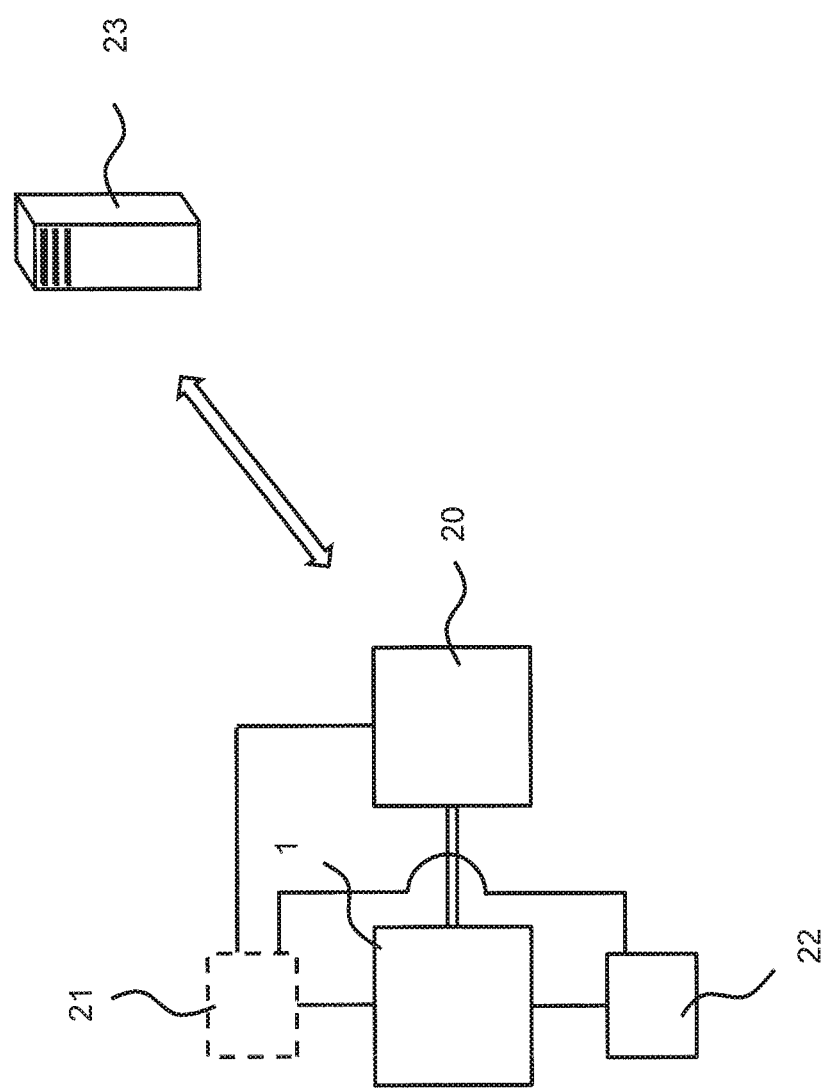
FIG. 2 is a schematic representation of functional elements of the rake apparatus.

Referring to FIG. 2, a schematic representation of functional components of a system for using and controlling the rake apparatus 1 is depicted. The rake apparatus 1 is coupling to a tractor 20 which will move the rake apparatus 1 over the field. As an optional component, there is a positioning system 21 configured to detect a local position of the rake apparatus 1 while the rake apparatus 1 is moved over the field. The local position can be determined with regard to the rake apparatus 1 and/or the tractor 20, wherein a distance between the rake apparatus 1 and the tractor 20 may be taken into account. The positioning system 21 may be provided as a satellite-based navigation system. In an alternative embodiment, the positioning system 21 is continuously determining position data for the rake apparatus on the field, e.g. to create a snake line form of the windrow which is adapted to field conditions like field geometry, driving of curves by the tractor, create a windrow according to specific requirements for a baler or loader wagon that will be used to pick up the crop, and/or get around obstacles.

A control unit 22 is connected to the rake apparatus 1 and the positioning system 21 for exchange of electronic data. The control unit 22 can process electronic data for generating control signals for controlling the rake apparatus 1. For this purpose the rake elements 4a, 4b, 5a, 5b are provided with local control units or devices which will process the control signals for operating the rake elements 4a, 4b, 5a, 5b in different modes of operation for forming the snake line formed windrow.

The different functional components may exchange electronic data with a central server 23 which may comprise a data base. Electronic data can consist of crop information like moisture or exact GPS locations where the crop is placed to calculate an optimal driving pattern prior to picking up the crop to minimize driving time and/or fuel consumption.

Figure 3:
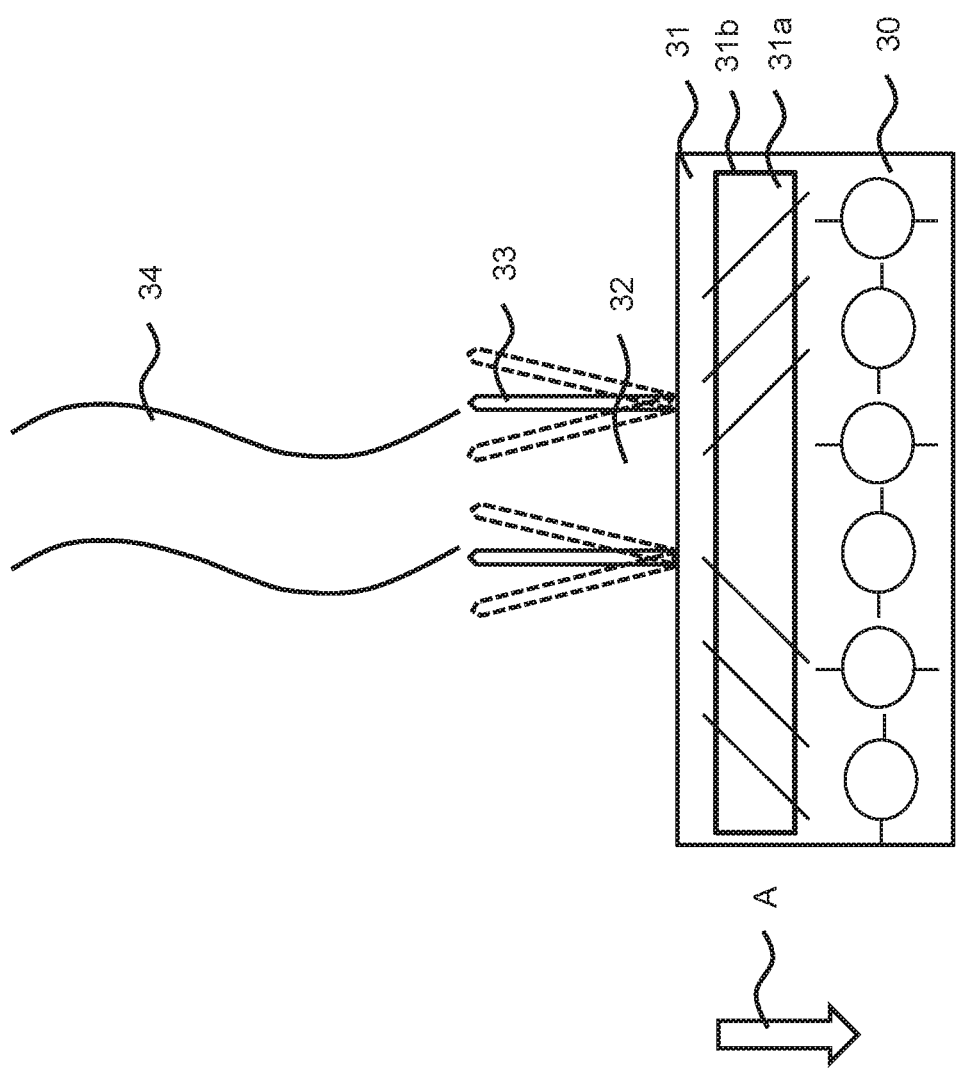
FIG. 3 is a schematic representation of an agricultural apparatus comprising cutting elements and crop engaging elements for forming a windrow from a previously-cut agricultural crop.

FIG. 3 shows a schematic representation of an agricultural apparatus comprising cutting elements 30 configured to cut agricultural crop. The cutting elements 30, for example, may be provided with an agricultural mower. Mowers as such are known in different configuration. The cutting elements 30 are followed by a crop pass 31 wherein the crop pass 31 according the shown embodiment consists of a conveyer 31b with a centering auger 31a configured to guide the crop material cut by the cutting elements 30 to an output 32 which is provided with crop engaging elements 33 pivotably received. As depicted in FIG. 3, the crop engaging elements 33 are pivotable between different positions, thereby, conditioning the previously cut agricultural crop for forming the snake line formed windrow 34 while the agricultural apparatus is moving over the field in the driving direction A.

In an alternative embodiment, the process of forming the snake line formed windrow may be supported by having a towing apparatus provided between the tractor and the agricultural apparatus as it is known as such from EP 3 008 985 A1. The towing apparatus may comprise at least one first member, which can be coupled to the agricultural apparatus and is associated with a second member. The second member in turn is associated with a third member, which can be coupled to a tractor for towing the agricultural machine. Either or both of the first member and the second member are controlled by at least one respective actuator, for the movement of the agricultural apparatus at least partially independently of the advancement of the tractor. The independent movement may be a snake line movement, thereby, supporting the process of forming the snake line windrow or swath.

The features disclosed in this specification, the figures and/or the claims may be material for the realization of various embodiments, taken in isolation or in various combinations thereof.

What is claimed is:

1. An agricultural apparatus for forming from a previously-cut agricultural crop a windrow on a field, comprising:
    a frame;
    crop engaging elements supported on the frame and configured to form from the previously-cut agricultural crop a windrow on a field; and
    a control unit that controls operation of the crop engaging elements, wherein the control unit provides control signals to the crop engaging elements in such a way that, in a windrow forming mode of operation, the crop engaging elements are driven to engage with the previously-cut agricultural crop, and form from the previously-cut agricultural crop the windrow having a snake line form on the field.

2. The agricultural apparatus according to claim 1, further comprising cutting elements supported on the frame and configured to cut the agricultural crop prior to the forming of the windrow.

3. The agricultural apparatus according to claim 2, further comprising a crop pass through which the previously-cut agricultural crop guided to the crop engaging elements.

4. The agricultural apparatus according to claim 1, comprising a pickup device configured to pick-up the previously-cut agricultural crop from the field.

5. The agricultural apparatus according to claim 3, wherein the crop pass further comprises a conveyor.

6. The agricultural apparatus according to claim 1, wherein the crop engaging elements comprise rake elements.

7. The agricultural apparatus according to claim 1, wherein the crop engaging elements comprise an output device provided with one or more movable forming elements and configured to output the previously-cut agricultural crop to the field.

8. The agricultural apparatus according to claim 1, wherein the control unit is further configured to:
    provide first control signals to the crop engaging elements in such a way that, in a first windrow forming mode of operation, the crop engaging elements are driven to engage with the previously-cut agricultural crop, and form from the previously-cut agricultural crop the windrow having a first snake line form on the field; and provide second control signals to the crop engaging elements in such a way that, in a second windrow forming mode of operation, the crop engaging elements are driven to engage with the previously-cut agricultural crop, and form from the previously-cut agricultural crop the windrow having a second snake line form on the field, the second snake line form being different from the first snake line form.

9. The agricultural apparatus according to claim 1, wherein the frame is an implement frame of an implement to be trailed by a tractor.

10. A method for forming from a previously-cut agricultural crop a windrow on a field, comprising:
    providing an agricultural apparatus;
    moving the agricultural apparatus over the field;
    controlling operation of crop engaging elements supported on a frame of the agricultural apparatus by a control unit of the agricultural apparatus;
    operating the crop engaging elements to engage with the previously-cut agricultural crop; and
    providing control signals to the crop engaging elements in such a way that, in a windrow forming mode of operation, the crop engaging elements are driven to engage with the previously-cut agricultural crop, and form from the previously-cut agricultural crop a windrow having a snake line form on the field.

11. The method according to claim 10, further comprising cutting the agricultural crop by cutting elements of the agricultural apparatus.

12. The method according to claim 10, further comprising passing the previously-cut agricultural crop through a crop pass provided in the agricultural apparatus to the crop engaging elements.

13. The method according to claim 11, further comprising passing the previously-cut agricultural crop through a crop pass provided in the agricultural apparatus to the crop engaging elements.

14. The method according to claim 10, further comprising forming the previously-cut agricultural crop by at least one of the following crop engaging elements: rake, pick-up device, conveyor, and output device provided with one or more movable conditioning elements.

15. The method according to claim 11, further comprising forming the previously-cut agricultural crop by at least one of the following crop engaging elements: rake, pick-up device, conveyor, and output device provided with one or more movable conditioning elements.

16. The method according to claim 13, further comprising forming the previously-cut agricultural crop by at least one of the following crop engaging elements: rake, pick-up device, conveyor, and output device provided with one or more movable conditioning elements.

17. The method according to claim 10, further comprising providing the agricultural apparatus on an implement and moving the implement over the field by a tractor trailing the implement.

18. The method according to claim 11, further comprising providing the agricultural apparatus on an implement and moving the implement over the field by a tractor trailing the implement.

19. The method according to claim 12, further comprising providing the agricultural apparatus on an implement and moving the implement over the field by a tractor trailing the implement.

20. The method according to claim 16, further comprising providing the agricultural apparatus on an implement and moving the implement over the field by a tractor trailing the implement.

* * * * *